United States Patent
Hogenkamp

(10) Patent No.: US 7,728,259 B2
(45) Date of Patent: Jun. 1, 2010

(54) METHOD AND DEVICE FOR HEAT TREATING A SHAPED PART

(75) Inventor: Wolfgang Hogenkamp, Remscheid (DE)

(73) Assignee: TMD Friction GmbH, Leverkusen (DE)

( * ) Notice: Subject to any disclaimer, the term of this patent is extended or adjusted under 35 U.S.C. 154(b) by 32 days.

(21) Appl. No.: 10/489,631

(22) PCT Filed: Sep. 12, 2002

(86) PCT No.: PCT/EP02/10259

§ 371 (c)(1),
(2), (4) Date: Aug. 9, 2004

(87) PCT Pub. No.: WO03/025416

PCT Pub. Date: Mar. 27, 2003

(65) Prior Publication Data

US 2004/0256034 A1 Dec. 23, 2004

(30) Foreign Application Priority Data

Sep. 14, 2001 (DE) ................................. 101 45 442
Jan. 5, 2002 (DE) ................................. 102 00 240

(51) Int. Cl.
*H05B 1/00* (2006.01)
(52) U.S. Cl. ............................ 219/162; 219/50; 100/38; 148/566; 148/571
(58) Field of Classification Search .................... 219/50, 219/155, 162, 425, 55; 148/566, 567, 568, 148/570, 571, 572, 573; 100/38
See application file for complete search history.

(56) References Cited

U.S. PATENT DOCUMENTS

| | | | | |
|---|---|---|---|---|
| 2,489,496 A | * | 11/1949 | O'Brien | 100/301 |
| 3,415,973 A | * | 12/1968 | Verbeck | 219/118 |
| 3,920,108 A | * | 11/1975 | Ely | 192/107 R |
| 3,946,190 A | * | 3/1976 | Hascoe | 219/86.9 |
| 4,193,956 A | * | 3/1980 | Kalnins | 264/406 |

(Continued)

FOREIGN PATENT DOCUMENTS

DE   3516759 A1   12/1985

(Continued)

*Primary Examiner*—Roy King
*Assistant Examiner*—Michael Aboagye
(74) *Attorney, Agent, or Firm*—Blakely, Sokoloff, Taylor & Zafman LLP

(57) ABSTRACT

A brake lining comprises a lining support plate, an underlayer material and a friction lining. The brake lining is clamped between a pressure plate and a holding fixture, which forms a hole matrix and inside of which electrodes are accommodated. A power supply is connected to the electrodes. The adjacent electrodes have different polarities. A current flow is produced between adjacent electrodes as a result of the different polarities. The field lines extend in the shape of an arch. An arrangement of this type permits the friction lining to be scorched. For hardening, a potential gradient can also be applied between the electrodes and the support plate. The current then flows and the entire friction lining is permeated. This results in a homogenous heating of the friction lining. The invention enables an efficient hardening of the friction lining. It is also possible to conduct a hardening and scorching simultaneously. The invention also enables the friction lining to be pressed during the heat treatment.

23 Claims, 1 Drawing Sheet

U.S. PATENT DOCUMENTS

| | | | | |
|---|---|---|---|---|
| 4,233,893 | A | * 11/1980 | Pringle | 100/301 |
| 4,321,457 | A | * 3/1982 | Edel et al. | 219/497 |
| 4,456,578 | A | * 6/1984 | Ward | 419/8 |
| 4,496,820 | A | * 1/1985 | Ritter et al. | 219/87 |
| 4,701,589 | A | * 10/1987 | Larsson | 219/50 |
| 5,383,917 | A | * 1/1995 | Desai et al. | 607/102 |
| 5,676,858 | A | * 10/1997 | Gantenbein | 219/64 |
| 5,744,773 | A | * 4/1998 | Van Otteren et al. | 219/50 |
| 5,907,995 | A | * 6/1999 | Zimmer et al. | 100/38 |
| 6,060,008 | A | 5/2000 | Czarnowski et al. | |
| 6,399,918 | B1 | * 6/2002 | Komine et al. | 219/243 |
| 6,803,694 | B2 | * 10/2004 | Decristofaro et al. | 310/216 |
| 2002/0046789 | A1 | 4/2002 | Grimme | |

FOREIGN PATENT DOCUMENTS

| | | |
|---|---|---|
| EP | 0263758 | 10/1987 |
| EP | 1085231 | 3/2001 |
| WO | WO 97/19277 | 5/1997 |

* cited by examiner

METHOD AND DEVICE FOR HEAT TREATING A SHAPED PART

The present patent application is a non-provisional application of International Application No. PCT/EP02/10259, filed Sep. 12, 2002.

BACKGROUND OF THE INVENTION

1. Field of the Invention

The invention relates to a method and an apparatus for heat treating a shaped member, particularly for hardening and/or scorching a friction lining of a brake or clutch lining.

2. Description of Related Art

Friction linings should exhibit a constant coefficient of friction to the greatest extent possible, even when they are first used. After its manufacture, however, an untreated lining generally has a decrease in its coefficient of friction when it is first loaded. Only after a certain running in time does the frictionally active surface of the lining carbonise so that the coefficient of friction stabilises.

Precisely when braking, a good braking action and a coefficient of friction which is constant over all loads is required from the very beginning for safety reasons. The friction lining is therefore frequently subjected to a post-treatment, which prevents so-called initial fading and stabilises the coefficient of friction.

It is known in practice to "scorch" friction linings after the grinding process. The lining is pressed against a hot plate at ca. 450° C. to 800° C. It is also known to flame the friction lining surface or to process it with laser beams or infra red light. As a result of the carbonisation of the friction lining surface, a friction lining is produced with a constant coefficient of friction. Linings pre-treated in this manner no longer need to be "braked in". They are fully capable of use from the very beginning.

One of the disadvantages of the known methods is the low degree of efficiency of the heat treatment. The energy losses are considerable as a result of the unnecessary heating of the environment and regions of the brake lining, which require no heat treatment. The process is also time-consuming. Similar considerations apply to the hardening of the brake lining. After the pressing process, the brake lining is commonly hardened in a furnace. Energy losses occur in this case also as a result of the heating of material which is "not relevant".

SUMMARY OF THE INVENTION

It is the object of this invention to reduce the energy losses occurring in the heat treatment and potentially to shorten the process.

In order to solve this object, the method referred to above is characterised in that a current flow is produced in the friction lining, at least in the region of its friction surface, for a predetermined period of time.

A substantial advantage of the invention is the targeted introduction of energy into the friction lining body, which is to be hardened or scorched, whereby the invention makes use of its electrical conductivity. The energy losses are low and the total energy consumption is also low since the friction lining composition is heated "outwardly from the interior". A further advantage resides in the short scorching or hardening times, which may be reduced to a few seconds or minutes.

A preferred embodiment is characterised in that at least two electrodes are brought into contact with the friction lining and that an electrical potential is applied to the electrodes.

The electrodes have a potential difference which produces the current flow. The friction lining composition constitutes an electrical resistor, which heats up. Metals, in particular, but also graphite, coke and carbon constituents are the electrically conductive components of the friction lining.

The electrical potential and the duration of the current flow are advantageously set in dependence on the depth and intensity of the heat treatment. The longer energy acts on the friction lining, the hotter the lining becomes and the greater is its "depth hardening". As a result of thermal conduction, regions through which current does not flow are also tempered over time. Furthermore, the electrode spacing and the electrodes shape also have an influence on the penetration depth of the electrical energy. The current density and thus the electrical energy which is introduced decreases with the spacing of the electrodes. If the electrodes are situated closely together, a low potential is sufficient in order to cause a high current flow, as is desired when e.g. scorching. A combination of hardening and scorching is basically also possible.

When hardening, a current flow is preferably produced between the friction surface and the opposite side of the friction lining or a support plate associated with the other side of the friction lining. Disc brake linings are generally hardened or scorched when mounted on the carrier plate. The potential gradient is thus produced between the friction surface and the carrier plate. Curved drum brake friction linings, on the other hand, are hardened or scorched without a carrier plate. The potential gradient is produced in this case between the opposite flat surfaces of the friction lining.

It is proposed in an important embodiment of the invention that the electrical resistance of the friction lining composition is measured between two electrodes and that the voltage and the duration of the current flow is set in dependence on the measured resistance of the friction lining. General information relating to the type, quality and homogeneity of the material used is obtained from the electrical resistance. The higher the electrical resistance, the higher must the applied voltage be and vice versa, if a defined amount of energy is to be supplied. When using a plurality of electrodes, variations in the resistance over the friction lining can be determined, as occur e.g. in a non-homogenous friction lining composition (for instance as a result of incomplete mixing). The potential and the duration of the current flow can be locally matched to the type and quality of the material. A permanent monitoring of quality during the heat treatment is then possible, in particular, if the electrical resistance is measured during the heat treatment and the parameters are also adjusted during the heat treatment. The invention thus permits a uniform heat treatment, even with a non-homogenous friction lining.

As already stated, the invention finds application particularly with hardening and/or scorching. The friction lining is preferably clamped and/or pressed during the heat treatment. A time- and cost-intensive working step is thus saved, on the one hand, and on the other hand, the formation of cracks and bubbles as a result of the release of gas and structural changes on and in the friction lining can be suppressed. The subsequent compressibility of the friction lining can be adjusted by the magnitude of the applied pressure.

The object of the invention is further solved by an apparatus of the type referred to, which is characterised by a device which produces a current flow in the friction lining, at least in the region of its friction surface, for a predetermined period of time. It is particularly advantageous if the device has at least two electrodes, which may be brought into contact with the surface of the friction lining and to which a voltage may be applied.

The electrodes can be of flat construction, whereby at least a respective one of the flat electrodes is associated with the friction surface of the friction lining and its opposite surface or the support plate arranged there. The electrodes can exert a pressure on the friction lining, preferably of 0.1 N/mm² to 5 N/mm².

A preferred embodiment is produced if the electrodes define a matrix, whereby a voltage may be applied to each two adjacent electrodes. The electrodes can thus be distributed over the entire surface area of the friction lining. The more electrodes are provided, the more precisely may the application of heat on or in the friction lining may be controlled. A relatively small spacing between the electrodes permits a "high resolution", i.e. the action of the heat can also be limited to the outer layers or local regions of the friction lining. The field lines between two electrodes extends substantially in an accurate shape. The higher the applied voltage, the deeper the energetically effective field lines extend into the brake lining. The further apart two adjacent electrodes are spaced from one another, the greater is the area of the heat treated region. The "resolution" is then coarser.

The electrodes are preferably mounted in a mounting, which affords a matrix of holes corresponding to the matrix. If the electrode mounting is moveable in the direction towards the friction lining, it can be used at the same time as a press die. As a result of the engagement of the mounting with the friction lining during the introduction of heat, the formation of cracks and bubbles in the friction lining is prevented. As previously mentioned, a working step can also be saved, namely a separate hardening of the friction lining. If a conventional friction lining press with a pressing tool equipped with electrodes is provided, the hardening and scorching process can proceed during the pressing process. A further substantial advantage of the lowerable mounting resides in its thermal insulation. Heat introduced into the friction lining is "held" in the friction lining by the engaging mounting.

A particularly simple embodiment is characterised in that electrodes of the same plurality are arranged in columns or lines. This produces a structurally particularly simple construction of the matrix, whereby, in particular, the contacting and control of the electrodes is favourable. In the normal case, the arrangement is, however, so selected that polarities alternating in columns and lines are provided.

A good contact between the electrodes and the friction lining is indispensable for the production of as homogenous a current flow as possible over the entire friction lining. The invention therefore proposes that the electrodes are individually axially moveable and are biased in the direction towards the friction lining, preferably by the force of a spring. The penetration depth of the electrodes into the friction lining can be adjusted by the biasing force.

It can of course be desired that the electrodes merely rest on the surface of the friction lining. This may also be set by the biasing of the spring force.

The apparatus in accordance with the invention is preferably designed for heat treating different shapes (and cross-sectional shapes) of friction linings. The electrodes are therefore preferably lowerable individually or in groups. For instance, only those electrodes are lowered onto the friction lining which are associated with the "active" friction surface of the lining; Undesired penetration of rigid electrodes can thus be prevented.

Particularly good contact between the electrodes and the friction lining is produced if the electrodes are pointed at their end closest to the friction lining.

Electrodes can consist of non-metallic materials (e.g. graphite). They are preferably constructed of good conducting, heat-resistant metals or metal alloys, for instance high-grade steel or platinum, etc. Clogging of the frictional material on the electrodes is thus prevented. The electrodes can be constructed with a core of copper or silver for the purpose of a better electrical conductivity.

For depth hardening, the invention proposes finally that the electrodes and a carrier plate associated with the side of a friction lining opposite to the friction surface have a potential gradient. A current flow is thus produced between the friction surface and the support plate or the surface remote from the friction surface and the friction lining is thus homogeneously heat treated. This type of hardening can be combined with the working step of scorching. Whilst the current for the hardening can generally be conducted directly through the friction lining, only the upper electrodes (with different polarities) are used for the scorching. The time saving as a result of the combination of the two working steps is considerable.

It can be advantageous in a few cases if the voltage sources are cycled and pulsed, preferably with a frequency of 0.1 Hz to 50 Hz. Voltages of 0.1V to 300V and current intensities of 1 A to 1000 A are advantageously used. Locally glowing or burning zones, which can result in an undesired change in material, are thus prevented. As a result of the brief interruption in the introduction of energy, the heat can flow away into the lining matrix. Overheating is prevented. Since direct current or alternating current can basically be used; very low frequency alternating currents are also effective.

As an alternative to an electrode matrix in columns and lines, the invention proposes that the electrodes be arranged on the peripheral of at least one roller and so constructed that they may be rolled over the friction lining. A roller arrangement permits hardening or scorching whilst moving. There is basically the possibility of arranging rollers of different polarity behind one another, whereby either the friction lining is passed under the rollers or vice versa. The current flow then occurs between each two rollers. Advantageously, however, a plurality of electrodes of alternating polarity are arranged on a roller. Provided between the electrodes, which are constructed, for instance, in the form of discs are insulating sections. Just one roller is sufficient for heat treating. A plurality of rollers can be arranged behind one another, which are spaced apart, for instance, by one cm, for a higher throughput and more uniform heating of the friction linings.

Further advantageous embodiments are characterised in the other dependent claims.

In the description of the invention, reference is made predominantly to the production of friction linings for brake or clutch linings. The invention is, however, applicable to the heat treatment of any desired shaped members, which consist of electrically conductive pressed compositions containing a bonding element. As a further example, carbon brushes of electric motors are referred to, the specific electrical resistance of which is 50 $\Omega mm^2/m$. In each case, a rapid uniform hardening of the bonding agent can be achieved with the method in accordance with the invention. Furthermore, a targeted and effective surface treatment is possible. The shape of the shaped members is of no substantial importance—see the machining of disc and drum friction linings.

BRIEF DESCRIPTION OF THE DRAWINGS

The invention will be described below in more detail with reference to the accompanying drawings, in which.

DETAILED DESCRIPTION OF THE DRAWINGS

Figure 1:
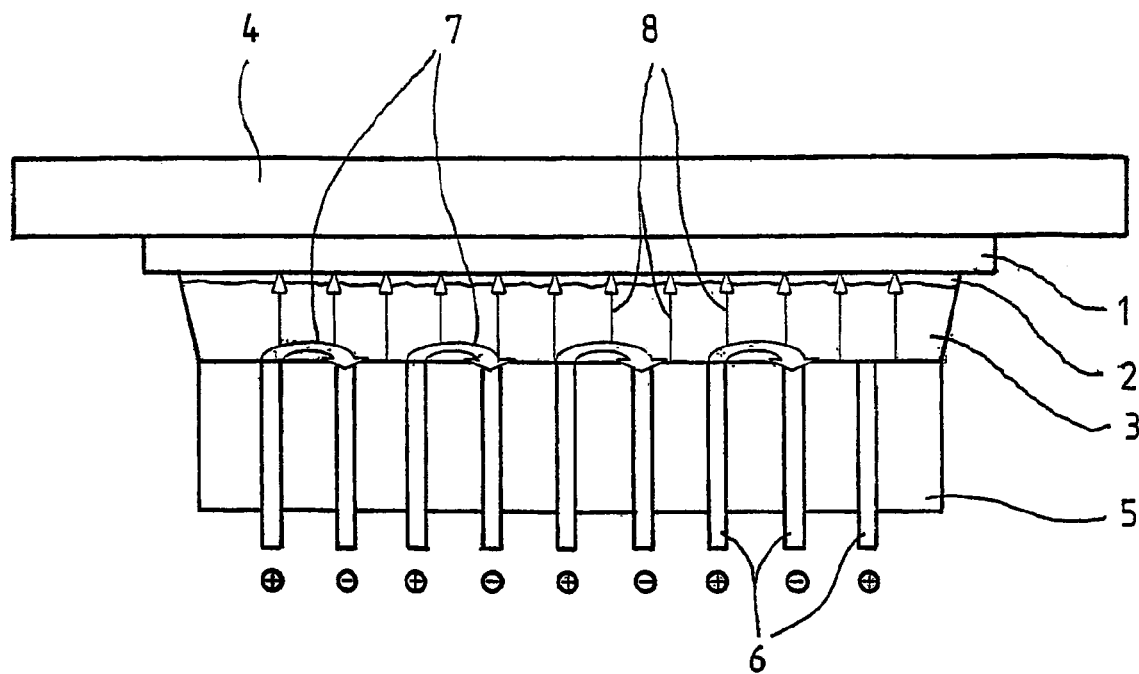
FIG. 1 is a schematic partly sectioned side view of a brake lining with electrodes applied.

The brake lining shown in FIG. 1 has a lining support plate 1, an underlayer composition 2 and a friction lining 3. The brake lining is clamped between a pressure plate 4 and a mounting 5, which defines a matrix of holes and in which electrodes 6 are mounted. The mounting 5 consists of non-conductive material. Connected to the electrodes 6 is a voltage source (not shown). The adjacent electrodes 6 have different polarities, as is indicated by "+" and "−". As a result of the different polarities, a current flow is produced between adjacent electrodes. This current flow is indicated by the arrows 7. The field lines extend in an accurate shape. The friction lining 3 may be scorched with such an arrangement.

For the purpose of hardening, a potential gradient can also be applied between the electrodes 6 and the support plate 1. The current flow then occurs in the direction of the arrows 8 and the entire friction lining is penetrated. The result is homogenous heating of the entire friction lining. The production of a current flow between the two opposite flat surfaces of the friction lining is equally possible. This alternative may be considered when hardening or scorching friction linings without a support plate, e.g. in the case of drum brake friction linings.

An efficient hardening of the friction lining 3 is possible with the invention. The illustrated arrangement additionally permits pressing of the friction lining during the hardening process. For this purpose, the brake lining is pressure loaded on one side by the mounting 5 and a reactive pressure is produced from the other side via a pressure plate 4. In addition to the application of pressure on two sides, lateral clamping of the brake or friction lining can of course also be affected.

The surface of the mounting 5 closest to the friction lining is planar. The contact ends of the electrodes 6 are also planar in the illustrated embodiment. They are rigidly mounted in the mounting 5. In particular, if the friction lining is not flat (e.g. concave or convex), it is possible to mount the electrodes 6 in the mounting 5 so as to be axially moveable and to bias them in the direction towards the friction lining. An optimum contact is thus produced. The contact ends of the electrodes can also be pointed for better contact.

The mounting 5, as shown, is of flat construction. The flat mounting 5 is, in particular, for disc brake lining. It is advantageous for curved drum brake linings to match the mounting to their curved shape in order that the electrodes can come into engagement with it or both sides without difficulty.

Figure 2:
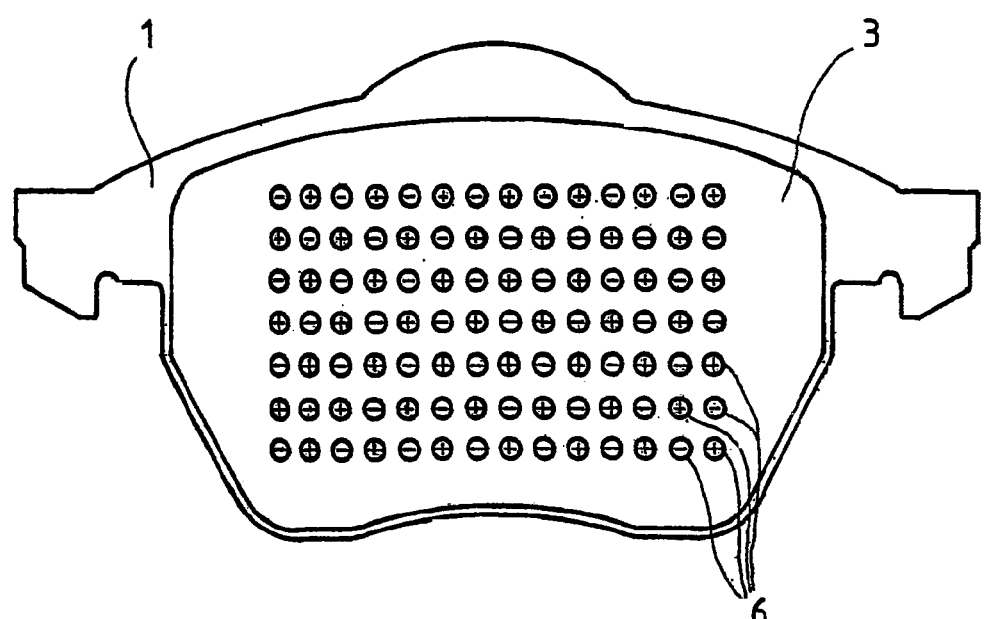
FIG. 2 is a schematic plan view of a brake lining with an electrode matrix shown.

FIG. 2 shows a matrix arrangement of the electrodes 6. The illustrated matrix does not cover the entire area of the friction lining 3. Embodiments are provided in which the electrode matrix extends beyond the friction lining 3 and the electrodes are merely lowered above the friction lining for the purpose of the heat treatment. A plurality of friction lining shapes can also be optimally heat treated with an electrode matrix.

The polarity of the electrodes is, as stated, indicated by "+" and "−". In the illustration, the polarities of the electrodes are distributed alternately in lines and columns. It is provided in another embodiment (not shown) that the polarities are the same by line or by column. This renders a simple connection of the electrodes 6 possible.

The apparatus operates in a very gentle manner. The overall wear is slight since only the lining and the components immediately adjoining the lining are thermally loaded.

The cycling of the current flow has, as mentioned, the advantage of preventing temporary overheating. It is, nevertheless, ensured that the critical temperature of 150° C. is not exceeded.

Numerous modifications are possible within the scope of the invention. Thus the electrodes can be of flat construction, one of the electrodes being associated with the friction surface and the other being associated with the opposite surface of the friction lining or the support plate provided there. Very uniform depth hardening may be achieved in this manner. There is the possibility of pressing the flat electrodes against the friction lining, preferably with a pressure of 0.1 N/mm² 25 N/mm².

In the case of friction linings with an area of ca. 50 mm² and a thickness of 14 mm, hardening times of 5 s to 180 s may be achieved.

The invention claimed is:

1. A method for heat treating a friction lining of a brake or clutch lining, the method comprising:
    bringing a plurality of electrodes into contact with a friction surface of the friction lining, wherein a potential difference is applied between adjacent electrodes brought in contact with the friction surface of the friction lining, and
    generating a current flow between said electrodes in a region of the friction lining close to the friction surface for a predetermined period of time to provide a heat treatment to the friction lining, wherein the electrodes are arranged with alternating polarities in columns and rows wherein the electrodes are mounted in a mounting, which defines a matrix of holes corresponding to the matrix.

2. The method as claimed in claim 1, wherein the electrical potential difference and the predetermined period of time of the current flow are set in dependence on a depth and an intensity of the heat treatment.

3. The method as claimed in claim 1, wherein an electrical resistance of the friction lining composition is determined between two electrodes and that the electrical potential difference and the period of time of the current flow are set in dependence on the determined resistance of the friction lining.

4. The method as claimed in claim 3, wherein the electrical resistance is measured during the heat treatment.

5. The method as claimed in claim 1, wherein a current flow is produced between the friction surface and an opposite side of the friction lining or a support plate associated with the opposite side of the friction lining.

6. The method as claimed in claim 1, wherein a current flow is produced between the friction surface and an opposite side of the friction lining or a support plate associated with the opposite side of the friction lining.

7. The method as claimed in claim 1, wherein a potential difference of 0.1V to 300V and a current of 1 A to 1000 A are used.

8. The method as claimed in claim 7, wherein the potential difference is pulsed or cycled.

9. The method as claimed in claim 8, wherein the pulse or cycle frequency is 0.1 Hz to 50 Hz.

10. An apparatus for heat treating a friction lining of a brake or clutch lining, comprising:
    a device comprising a plurality of electrodes brought into contact with a friction surface of the friction lining, wherein between adjacent electrodes a potential difference is applied,
    the device being configure so that it generates a current flow in a region of the friction lining close to the friction surface for a predetermined period of time to provide a heat treatment to the friction lining, wherein the electrodes are arranged with alternating polarities in columns and rows wherein the electrodes are mounted in a mounting, which defines a matrix of holes corresponding to the matrix.

11. The apparatus as claimed in claim 10, wherein the electrodes are so arranged that they define a matrix, wherein the potential difference is applied to each two adjacent electrodes.

12. The apparatus as claimed in claim 10, wherein the electrode mounting is moveable in a direction towards the friction lining.

13. The apparatus as claimed in claim 11, wherein the electrodes of the same polarity are arranged in columns or rows.

14. The apparatus as claimed in claim 10, wherein the electrodes are individually axially moveable and are biased in the direction towards the friction lining.

15. The apparatus of claim 14, wherein the electrodes are biased by a force of a spring.

16. The apparatus as claimed in claim 10, wherein the electrodes are lowered individually or in groups.

17. The apparatus as claimed in claim 10, wherein the electrodes are pointed at their ends closest to the friction lining.

18. The apparatus as claimed in claim 10, wherein a spacing of the electrodes of different potential is smaller than the thickness of the friction lining.

19. The apparatus as claimed in claim 10, wherein the electrodes and a support plate associated with a side of the friction lining opposite to the friction surface have a potential gradient.

20. The apparatus as claimed in claim 10, wherein the electrodes are arranged on the periphery of at least one roller, which is rolled over the friction lining.

21. The apparatus as claimed in claim 20, wherein a plurality of electrodes of alternating polarity are arranged on a roller.

22. The apparatus as claimed in claim 10, wherein the electrodes are of flat construction, at least one respective electrode being associated with the friction surface and the opposite surface of the friction lining or the support plate provided on the latter.

23. The apparatus as claimed in claim 22, wherein the electrodes are connected to means for producing a pressure.

* * * * *